United States Patent
Hernandez

(12) 
(10) Patent No.: US 7,073,996 B1
(45) Date of Patent: Jul. 11, 2006

(54) TWO-PIECE CRANK HANGER SET FOR BICYCLES

(76) Inventor: Eduardo A. Hernandez, 838 NW. 42nd Pl., Pompano Beach, FL (US) 33064

( * ) Notice: Subject to any disclaimer, the term of this patent is extended or adjusted under 35 U.S.C. 154(b) by 197 days.

(21) Appl. No.: 10/722,040

(22) Filed: Nov. 24, 2003

Related U.S. Application Data

(63) Continuation-in-part of application No. 10/379,163, filed on Mar. 3, 2003, now abandoned.

(51) Int. Cl.
*F16B 39/02* (2006.01)

(52) U.S. Cl. ............... 411/271; 74/594.1; 74/594.2

(58) Field of Classification Search ............ 74/594.1, 74/594.2; 411/271
See application file for complete search history.

(56) References Cited

U.S. PATENT DOCUMENTS

| 626,227 | A | | 6/1899 | Gagler | |
|---|---|---|---|---|---|
| 2,277,748 | A | * | 3/1942 | Duffy | 384/458 |
| 3,906,811 | A | | 9/1975 | Thun | |
| 4,201,120 | A | * | 5/1980 | Segawa | 74/594.2 |
| 4,439,078 | A | * | 3/1984 | Dessouroux | 411/178 |
| 4,704,919 | A | | 11/1987 | Durham | |
| 4,936,597 | A | * | 6/1990 | Hartmann | 280/231 |
| 6,244,750 | B1 | * | 6/2001 | Chiang | 384/545 |
| 6,276,885 | B1 | * | 8/2001 | Yamanaka | 411/403 |
| 6,439,817 | B1 | * | 8/2002 | Reed | 411/110 |
| 6,829,965 | B1 | * | 12/2004 | Mombrinie | 74/594.2 |

OTHER PUBLICATIONS

Clarence W. Coles, et al., "Glenn's Complete Bicycle Manual", 1973, pp. 285 & 296.

* cited by examiner

*Primary Examiner*—Katherine Mitchell
(74) *Attorney, Agent, or Firm*—Robert E. Howard

(57) ABSTRACT

A two-piece crank hanger set including a left crank arm having a tubular crank spindle attached thereto and a right crank arm having at least one chain sprocket wheel attached thereto. The crank spindle extends through a bicycle crank tube. Bearing cups are removably attached to both ends of the crank tube. Bearing retainers having tapered roller bearings engage the bearing cups. A tubular stop member is held in place on the outer end of the crank spindle by a spline mechanism. A preload and attachment bolt passes through the right crank arm and chain sprocket wheel and into threadable engagement with a threaded inner surface of the outer end of the tubular crank spindle. The preload and attachment bolt is tightened to preload the bearings.

5 Claims, 3 Drawing Sheets

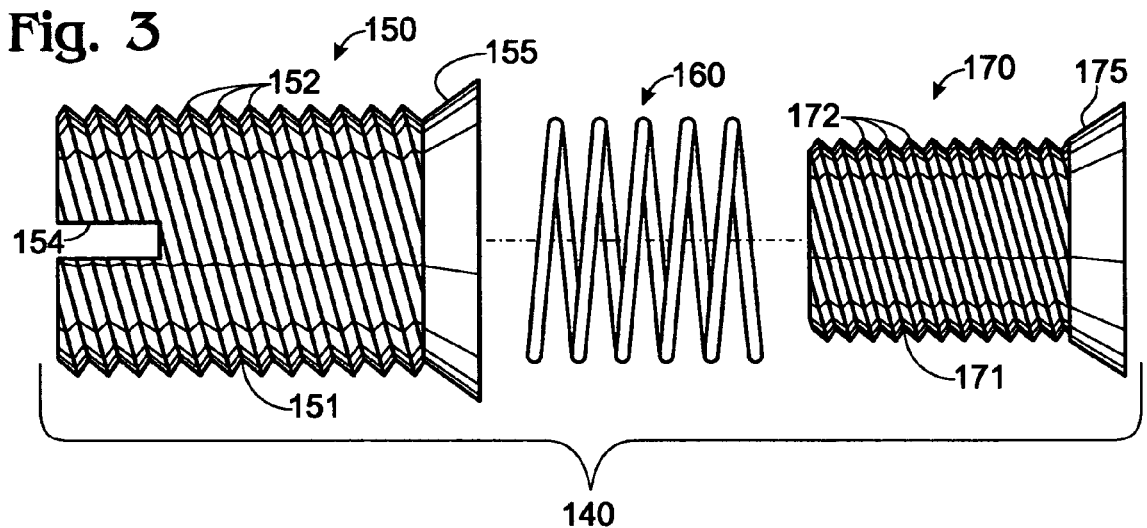
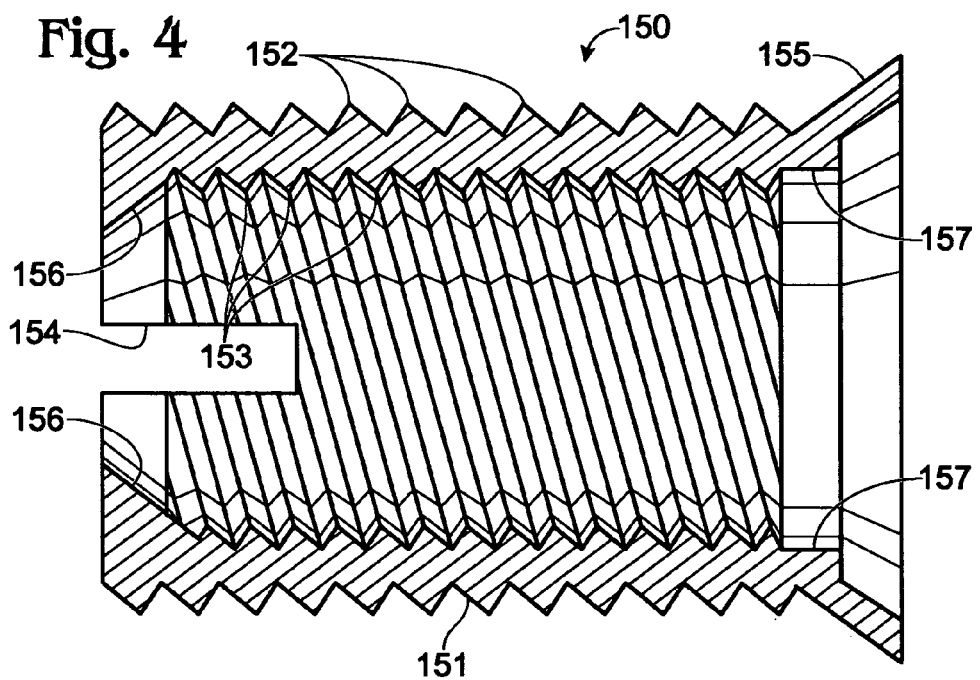

TWO-PIECE CRANK HANGER SET FOR BICYCLES

CROSS-REFERENCE TO RELATED APPLICATIONS

This is a continuation-in-part of application Ser. No. 10/379,163, filed Mar. 3, 2003 now abandoned.

BACKGROUND OF THE INVENTION

This invention relates to a two-piece crank hanger set for bicycles wherein crank assembly and bearing preload are accomplished simultaneously and without the use of special tools.

Commercially available bicycle crank hanger sets are typically either one-piece or three-piece.

In one-piece crank hanger sets, both crank arms are integral with a central spindle which is rotatably supported by bearings mounted in the bottom bracket or crank tube.

In three-piece crank hanger sets, a spindle is rotatably supported by bearings mounted in the bottom bracket or crank tube with the crank arms removably mounted on the ends of the spindle.

Although several references have described two-piece crank hanger sets, wherein the spindle is formed integral with the drive side crank arm and the non-drive side crank arm attached to the free end of the spindle, such devices have the bearings mounted in the crank tube in configurations similar to the one and three-piece crank hanger sets. See, for example, U.S. Pat. Nos. 627,597, 3,906,811, and 4,704,919.

In all of these hanger sets, special tools are typically required for assembly and disassembly of the hanger sets and bearings, and the process is somewhat complicated.

BRIEF SUMMARY OF THE INVENTION

The two-piece crank hanger set of the present invention includes a left crank arm having a tubular crank spindle attached thereto and a right crank arm having at least one chain sprocket wheel attached thereto.

The tubular crank spindle extends through a bicycle crank tube having left and right ends. Left and right bearing cups are removably attached to the left and right ends, respectively, of the bicycle crank tube.

A left bearing retainer having a circumferential race retaining a plurality of tapered roller bearings is press fit onto the left end of the crank spindle and engages the left bearing cup.

A right bearing retainer having a circumferential race retaining a plurality of tapered roller bearings is press fit onto the exterior surface of a tubular stop member.

The tubular stop member is held in place on the outer end of the crank spindle by a spline mechanism.

A preload and attachment bolt passes through axial openings in the right crank arm and chain sprocket wheel, and into threadable engagement with a threaded inner surface of the right end of the tubular crank spindle. The bolt is tightened to complete the assembly of the two-piece crank hanger set and to preload the bearings.

A preferred preload and attachment bolt includes an external sleeve, a coil spring, and an internal sleeve. The coil spring fits around the internal sleeve, which is adapted to be screwed into the external sleeve, and has a preselected compression resistance which prevents the inner sleeve from rotating relative to the external sleeve until the external sleeve has reached a prescribed torque during tightening.

Thus, the only tool required for assembly and bearing preloading of the two-piece crank hanger set of the present invention is that used to tighten the preload and attachment bolt.

BRIEF DESCRIPTION OF THE DRAWINGS

FIG. 3 is an exploded side elevation view of a preferred embodiment of a preload and attachment bolt mechanism; and FIG. 4 is an enlarged side elevation view, in cross-section, of the external sleeve of the preferred embodiment of the preload and attachment bolt mechanism.

DESCRIPTION OF PREFERRED EMBODIMENTS

Figure 1:
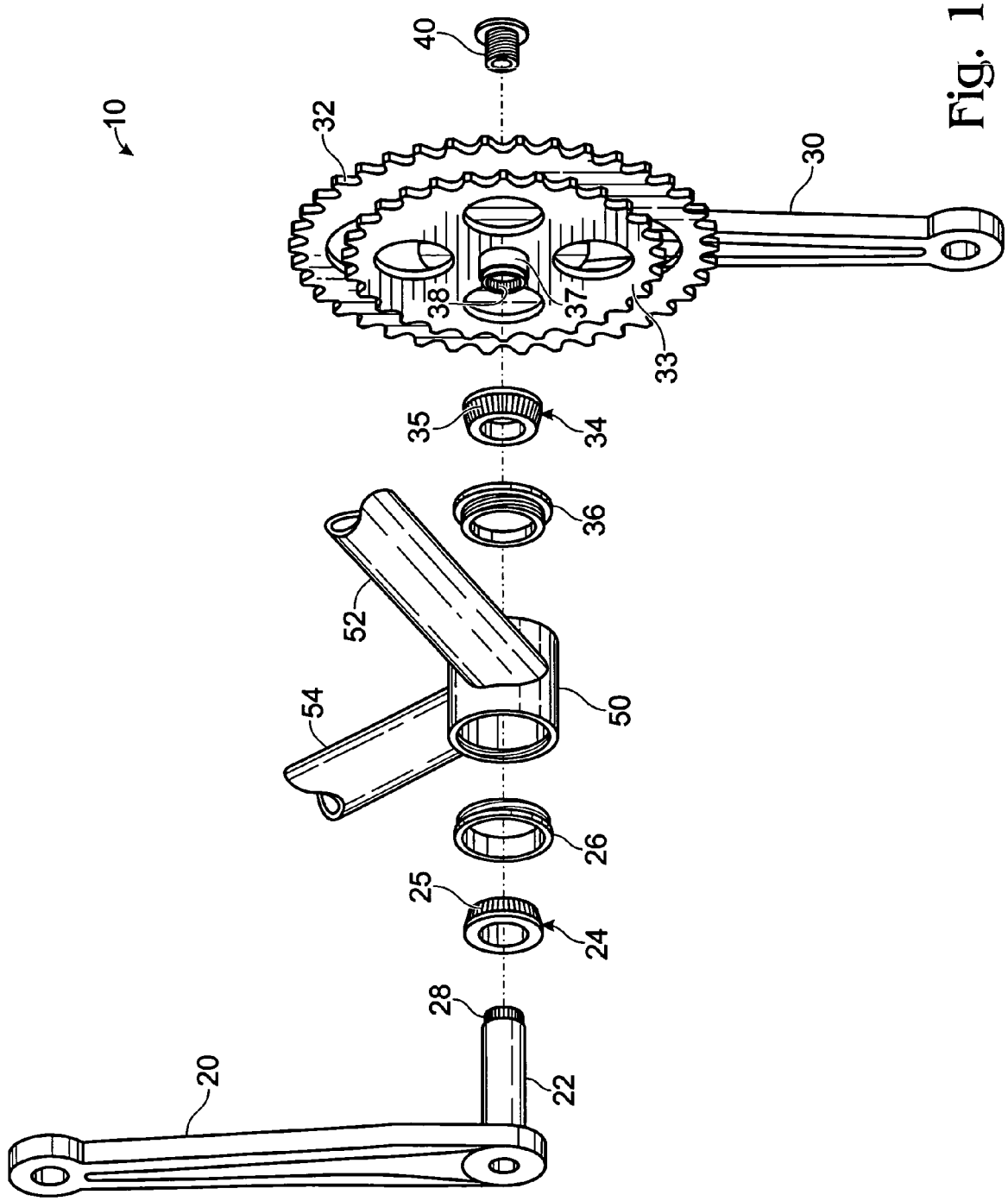
FIG. 1 is an exploded, rear perspective view of the two-piece crank hanger set of the present invention.
Figure 2:
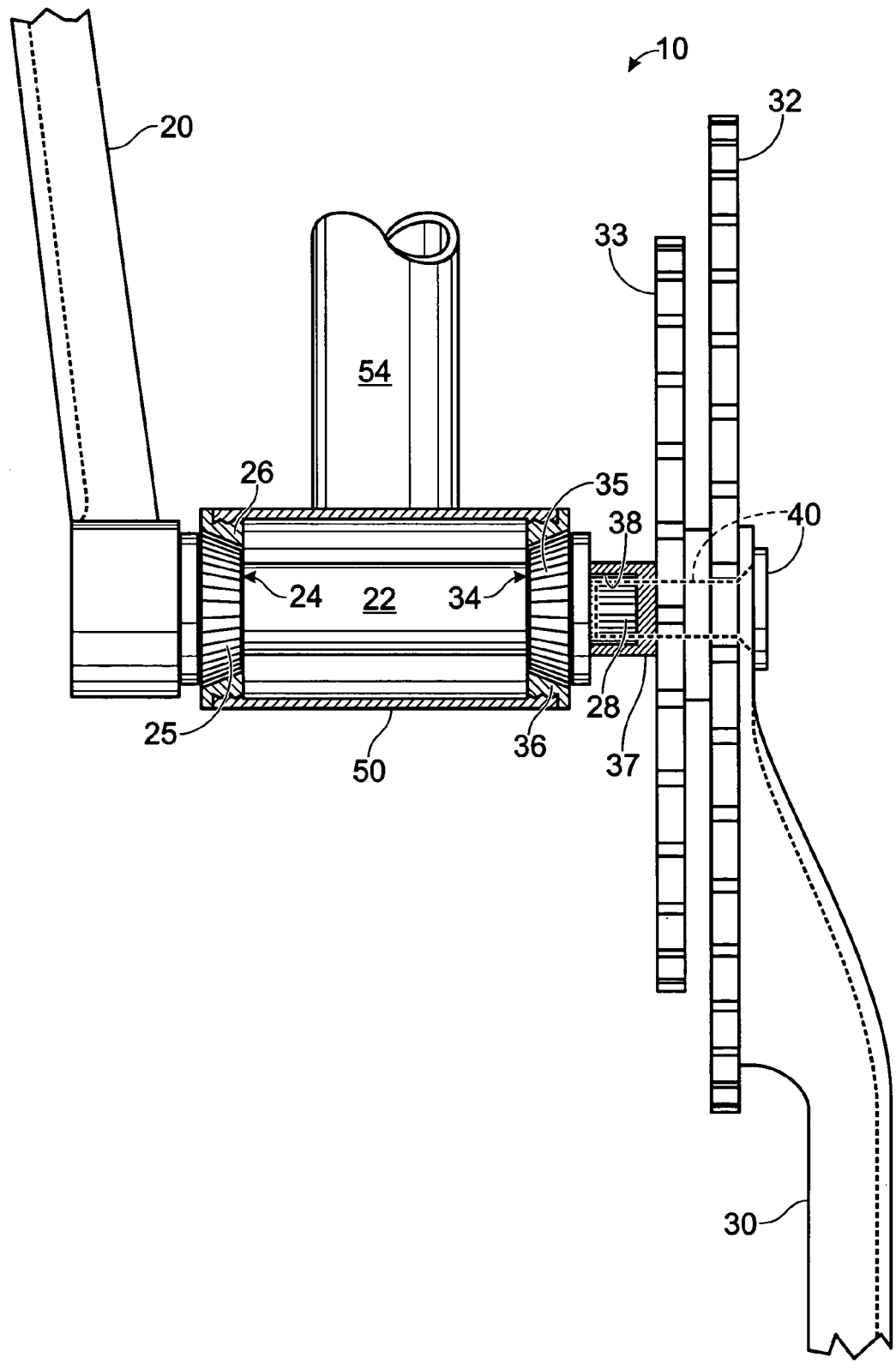
FIG. 2 is an enlarged, partial rear elevation view, in cross-section, showing the two-piece crank hanger set of the present invention in its assembled form.

The two-piece crank hanger set 10 includes a left, non-drive side crank arm 20 having a tubular crank spindle 22 attached thereto, a right, drive side crank arm 30 having outer and inner chain sprocket wheels 32 and 33, respectively, attached thereto, left and right bearing retainers 24 and 34, respectively, left and right bearing cups 26 and 36, respectively, tubular stop member 37, and bolt 40.

Left and right crank arms 20 and 30 each have an axial end located along the longitudinal axis of the bicycle's crank tube 50, and a distal end located at the end opposite to the axial end. The distal ends of left and right crank arms 20 and 30 are attached to pedals (not shown) in a manner conventional in the art.

Although the invention is described as being used where two chain sprocket wheels 32 and 33 are present, the invention can be used with a bicycle having a single chain sprocket wheel, or a bicycle having triple chain sprocket wheels. The manner of attachment of the chain sprocket wheels 32 and 33 to right crank arm 30, and their spacing, is that conventionally used in the art.

Left and right bearing retainers 24 and 34 are identical, and each have a circumferential race retaining a plurality of tapered roller bearings 25 and 35, respectively. Bearing retainers 24 and 34 are commercially available.

Two-piece crank hanger set 10 is intended to be used with a bicycle (not shown) having a crank tube or bottom bracket 50 attached to a seat tube 52, down tube 54, and chainstays (not shown), all as is well known in the bicycle art.

Left and right bearing cups 26 and 36 have external threads that are adapted to threadably mate with internal threads located at the left and right ends of crank tube 50, as shown. Bearing cups 26 and 36 are commercially available (such as Timken A4138B), and can be threaded to be compatible with the threads of crank tube 50.

The outer (right) end of tubular crank spindle 22 is adapted to be inserted into tubular stop member 37. Tubular stop member 37 is held in place on tubular crank spindle 22 by a spline mechanism. The spline mechanism allows for some horizontal movement of tubular stop member 37 along tubular crank spindle 22 during preloading of the bearings, as will be explained further below.

The outer (right) end of tubular crank spindle 22 contains a plurality of longitudinally extending, externally located teeth 28 that extend around the entire external surface of the outer end of crank spindle 22.

Tubular stop member 37 is adapted to be attached to the outer end of crank spindle 22, and has a plurality of longitudinally extending, internally located teeth 38 that extend around the entire internal surface of tubular stop member 37.

The number, size and spacing of teeth 28 of crank spindle 22, and teeth 38 of tubular stop member 37, are identical in order that they will mesh when tubular stop member 37 is placed onto the outer end of tubular crank spindle 22. Thus, either teeth 28 or 38 act as the "keys" of a spline mechanism with the spaces between teeth 28 or 38 acting as the "grooves" of a spline mechanism. While it is preferred to have a plurality of teeth 28 and 38 forming keys or grooves that encompass the outer end of tubular spindle 22 and the inner surface of tubular stop member 37, respectively, a fewer number could be used, including a single key and groove.

The inner surface of the outer end of tubular crank spindle 22 is threaded and adapted to receive and mate with the external threads of bolt 40.

In assembling the two-piece crank hanger set 10, left and right bearing cups 26 and 36 are screwed into the left and right ends of crank tube 50, respectively. Left bearing retainer 24 is press fit onto tubular crank spindle 22, and positioned to substantially abut left crank arm 20. Tubular crank spindle 22 is inserted through left bearing cup 26, crank tube 50, and right bearing cup 36 until tapered roller bearings 25 come into contact with the inner tapered wall of left bearing cup 26, as shown. Right bearing retainer 34 is press fit onto tubular stop member 37, and will substantially abut right inner sprocket wheel 33 upon completion of assembly.

Tubular stop member 37 is then placed onto the outer end of tubular crank spindle 22 with teeth 28 meshing with teeth 38.

Finally, bolt 40 is inserted into and through the aligned axial openings located in right crank arm 30, outer and inner sprockets 32 and 33, and tubular stop member 37. The outer threads of bolt 40 and the inner threads located at the outer end of tubular crank spindle 22 are threadably engaged, and bolt 40 is then tightened to the degree required to complete the assembly and to properly preload bearings 25 and 35.

Thus, bearing preload and retention are accomplished simultaneously with attachment of the crankarm via bolt 40.

Bolt 40 is preferably replaced by an improved preload and attachment assembly 140, as shown in FIGS. 3 and 4. The improved assembly 140 reduces or eliminates the problem inherent with bolt 40 of the possibility of it being shaken loose during use. Herein whenever the phrase "preload and attachment bolt" is used, it is intended to include both bolt 40 and preload and attachment assembly 140.

Preload and attachment assembly 140 includes external sleeve 150, coil spring 160, and internal sleeve 170.

External sleeve 150 includes a hollow, cylindrical sleeve body 151 having internal and external cylindrical surfaces. The external cylindrical surface of hollow sleeve body 151 contains external threads 152. The internal surface of hollow sleeve body 151 contains internal threads 153. Two expansion slots are cut into the inner end of hollow sleeve body 151. Expansion slots 154 are 180 degrees apart, and only one slot 154 is shown in FIG. 3. More than two expansion slots 154 may be used, and would be equally spaced apart. The outer end of hollow sleeve body 151 has a flange 155. The wall of the inner end of hollow sleeve body 151 is thickened at taper 156. A circumferential coil spring stop member 157 is located within flange 155, as shown.

Internal sleeve 170 preferably has a hollow, cylindrical sleeve body 171. Hollow sleeve body 171 has internal and external cylindrical surfaces. The external cylindrical surface of hollow sleeve body 171 contains external threads 172. External threads 172 of hollow sleeve body 171 are adapted to threadably engage and mate with the internal threads 153 of hollow sleeve body 151. The outer end of hollow sleeve body 171 had a flange 175.

The internal threads 153 of external sleeve body 151 and the external threads of internal sleeve body 171 are preferably "coarse" threads of a worm gear type, and preferably have a mating orientation of between about 40 degrees and about 50 degrees, preferably about 45 degrees, relative to the axis of the respective sleeve bodies.

During assembly, outer sleeve 150 is inserted into and through the aligned axial openings located in right crank arm 30, outer and inner sprocket wheels 32 and 33, and tubular stop member 37. The outer threads 152 of outer sleeve 150 and the inner threads located at the outer end of tubular crank spindle 22 are threadably engaged.

Coil spring 160 is placed around internal sleeve 170, and inner sleeve 170 is partially screwed into outer sleeve 150 by virtue of the mating engagement of the inner threads 153 of outer sleeve 150 and the outer threads 172 of inner sleeve 170. The inner end of coil spring 160 abuts against coil spring stop member 157, and the outer end of coil spring 160 abuts against flange 175 of internal sleeve 170.

External sleeve 150 with internal helical threading 153, coil spring 160, internal sleeve 170 with external helical threading 172, and flange 175 against which coil spring 160 abuts, form a torque sensitive helical gear 140. Coil spring 160 has a spring rate (compression resistance) that, together with the coarseness of the threads 153 and 172 of external sleeve body 151 and internal sleeve body 171, will prevent inner sleeve 170 from rotating relative to outer sleeve 150 until a prescribed torque load has been placed upon the bearing mechanism by outer sleeve 150. Upon reaching the prescribed torque load, coil spring 160 will start to compress as internal helical threading 153 and external helical threading 172 acuate and start to rotate relative to one another. Actuation of the helical components, i.e., rotational engagement of threads 153 and 172, will eventually cause the inner end of inner sleeve 170 to be completely screwed into outer sleeve 150 thereby exerting force against internal tapered end surface 156 of outer sleeve 150. This force will cause the end of outer sleeve 150 containing slots 154 to expand, providing resistance to the mechanism shaking itself loose during use.

Preload and attachment assembly 140 may be used in a variety of attachment situations to apply a prescribed torque load to an attachment member, i.e., preload and attachment assembly 140 my be used with attachment members other than tubular crank spindles of a bicycle crank hanger set.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A preload and attachment bolt assembly comprising an external sleeve, a coil spring, and an internal sleeve;

said external sleeve having an external sleeve body that is a hollow cylinder having an inner end and an outer end, said external sleeve body having internal and external cylindrical surfaces having internal and external helical threads located thereon, respectively, said external threads adapted to threadably engage an attachment member, at least two expansion slots located in the inner end of said external sleeve body, said inner end of said external sleeve body having a thickened internal taper projection that projects into the hollow cylinder and tapers such that the hollow cylinder sleeve body is thickest at the innermost inner end, an external sleeve flange located on the outer end of said external sleeve body, and a spring stop member located within said external sleeve flange;

said internal sleeve having an internal sleeve body that is a hollow cylinder having an inner end and an outer end, said internal sleeve body having an external cylindrical surface having external helical threads located thereon adapted to mate with said internal helical threads of said external sleeve body, and an internal sleeve flange located on the outer end of said internal sleeve body;

said coil spring having an inner and outer end, said coil spring adapted to being positioned around said internal sleeve body with said inner end of said coil spring being in abutment with said spring stop member of said external sleeve and said outer end of said coil spring being in abutment with said internal sleeve flange;

said internal sleeve body adapted to be completely screwed into said external sleeve body to thereby cause the inner end of said internal sleeve body to engage said thickened internal taper of said external sleeve body and to cause said inner end of said external sleeve body to expand.

2. The apparatus of claim 1 wherein said coil spring has a compression resistance that prevents said internal sleeve from being completely screwed into said external sleeve until a prescribed torque load has been placed upon said attachment member.

3. The apparatus of claim 2 wherein said external sleeve body and said internal sleeve body each have a longitudinal axis, and said internal threads of said external sleeve body and said external threads of said internal sleeve body are oriented at a mating angle of between about 40 degrees and about 50 degrees to the longitudinal axis of their respective sleeve bodies.

4. The apparatus of claim 3 wherein said mating angle is about 45 degrees.

5. The apparatus of claim 3 wherein said internal threads of said external sleeve body and said external threads of said internal sleeve body are coarse.

\* \* \* \* \*